US006514597B1

(12) United States Patent
Strobel et al.

(10) Patent No.: US 6,514,597 B1
(45) Date of Patent: Feb. 4, 2003

(54) EMBOSSED ORIENTED POLYMER FILMS

(75) Inventors: Joan M. Strobel, Maplewood, MN (US); Mark A. Strobel, Maplewood, MN (US); Patrick J. Hager, Woodbury, MN (US); Ronald S. Kapaun, North St. Paul, MN (US)

(73) Assignee: #M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/497,971

(22) Filed: Feb. 4, 2000

Related U.S. Application Data

(63) Continuation-in-part of application No. 08/942,062, filed on Oct. 1, 1997, now abandoned.

(51) Int. Cl.$^7$ .............................. B32B 3/28; B32B 3/30; B32B 3/00; B32B 7/02
(52) U.S. Cl. ................. 428/167; 428/156; 428/332; 428/337; 428/338; 428/339; 428/213; 428/215; 428/216; 428/220
(58) Field of Search ................. 428/174, 179, 428/181, 183, 184, 186, 213, 215, 216, 220, 506, 521, 523, 156, 167, 332, 337, 338, 339

(56) References Cited

U.S. PATENT DOCUMENTS

| | | | | |
|---|---|---|---|---|
| 2,926,105 | A | 2/1960 | Steinhauser et al. | 117/76 |
| 2,976,567 | A | 3/1961 | Jones et al. | 18/10 |
| 3,331,729 | A | 7/1967 | Danielson et al. | 161/162 |
| 3,578,622 | A | 5/1971 | Brown et al. | 260/33.8 |
| 3,832,267 | A | 8/1974 | Liu | 161/116 |
| 3,871,947 | A | * 3/1975 | Brekken | 161/116 |
| 3,904,465 | A | 9/1975 | Hause | 156/199 |
| 4,248,822 | A | 2/1981 | Schmidt | 264/154 |
| 4,379,774 | A | * 4/1983 | Andersen et al. | 264/284 |

(List continued on next page.)

FOREIGN PATENT DOCUMENTS

| | | | |
|---|---|---|---|
| DE | 1 704 986 | 6/1971 | |
| DE | 2 402 120 | 8/1974 | |
| EP | 0 048 948 | 4/1982 | |
| FR | 1 283 953 | 1/1962 | |
| JP | 52-32980 | 3/1977 | ........... B32B/27/32 |
| JP | 10-329214 | 12/1998 | ........... B29C/59/04 |
| WO | WO 00/58090 | 10/2000 | |

OTHER PUBLICATIONS

"Dynamic Mechanical Properties," *Encyclopedia of Polymer Science and Engineering*, vol. 5, pp. 299–300, John Wiley & Sons, New York (1986).

"Films, Manufacture," *Encyclopedia of Polymer Science and Engineering*, vol. 7, pp. 96–102, John Wiley & Sons, New York (1987).

J. Strobel & S. Nam, *Orientation Development in Retensilized, Biaxially Oriented Polypropylene Films*, J. Applied Polymer Science, vol. 42, pp. 159–168 (1991).

J.A. Bryson, *Plastics Materials*, 6th ed., p. 45, Butterworth–Heinemann (1995).

E.P. Moore, Jr., ed., *Polypropylene Handbook*, p. 310, Hanser Publishers, New York (1996).

Primary Examiner—Harold Pyon
Assistant Examiner—Michael C. Miggins
(74) Attorney, Agent, or Firm—Douglas B. Little; Dean M. Harts

(57) ABSTRACT

Embossed oriented thermoplastic films and methods of making them are described. The embossed oriented thermoplastic films have substantially the same mechanical properties as unembossed oriented thermoplastic films. The depth of the embossments ranges from about 1 $\mu$m to about 200 $\mu$m. The methods include providing an oriented thermoplastic film having first and second major surfaces, softening at least one of the first and second major surfaces to produce a softened surface, embossing the softened surface to produce an embossed oriented thermoplastic film, and cooling the embossed oriented thermoplastic film.

22 Claims, 3 Drawing Sheets

U.S. PATENT DOCUMENTS

| | | | |
|---|---|---|---|
| 4,411,943 A | * 10/1983 | Akao | 428/161 |
| 4,451,533 A | 5/1984 | Wong et al. | 428/337 |
| 4,477,506 A | 10/1984 | Wang | 428/172 |
| 4,634,484 A | 1/1987 | Wagner | 156/219 |
| 4,699,842 A | 10/1987 | Jorgensen et al. | 428/343 |
| 4,808,363 A | 2/1989 | Walsh et al. | 264/288.4 |
| 4,835,217 A | 5/1989 | Jorgensen et al. | 525/93 |
| 5,108,814 A | * 4/1992 | Harp et al. | 428/156 |
| 5,328,653 A | * 7/1994 | Hyde et al. | 264/284 |
| 5,366,681 A | 11/1994 | Ohara et al. | 264/171 |
| 5,411,805 A | 5/1995 | Magill | 428/411.1 |
| 5,474,820 A | 12/1995 | Murschall et al. | 428/35.7 |
| 5,516,581 A | 5/1996 | Kreckel et al. | 428/317.3 |
| 5,618,618 A | 4/1997 | Murschall et al. | 428/331 |
| 5,747,174 A | 5/1998 | Kimura et al. | 428/480 |
| 6,096,247 A | 8/2000 | Ulsh et al. | 264/2.7 |

* cited by examiner

EMBOSSED ORIENTED POLYMER FILMS

This is a continuation-in-part of U.S. Ser. No. 08/942,062, filed Oct. 1, 1997, now abandoned, the disclosure of which is herein incorporated by reference.

FIELD OF THE INVENTION

This invention relates to thermoplastic polymer films. In particular, this invention relates to embossed oriented thermoplastic films and to the process for forming these films.

BACKGROUND OF THE INVENTION

The use of oriented films is widespread, particularly with films comprised of semi-crystalline thermoplastic polymers. These oriented films are characterized by high tensile strength and low-to-moderate elongation. Orientation can also influence crystalline order and hence the melting or softening point of an oriented polymer.

It is known that unoriented polymeric materials, such as polypropylene, can be embossed during casting. However, in the manufacture of oriented polymer films, the cast-embossing process cannot be used. Orientation of a film is carried out by casting a polymer sheet and subsequently heating and stretching (also known as drawing) the sheet into an oriented film. An embossed pattern produced during the casting of the sheet is destroyed by an orientation process.

Embossed polymer films are desirable because of the decorative or other surface effects produced on the films. For example, low gloss values are desirable on embossed polymer films because they are useful, for example, as adhesive-tape backings. Embossing of polymer films is also useful in changing the frictional characteristics of the film (e.g., to alter slip properties) or to alter its adhesion to a surface.

Methods to emboss oriented films have been proposed but these require heating to temperatures and for times that cause the oriented polymer film to lose desirable bulk mechanical properties (such as low-to-moderate elongation and high tensile strength). In addition, such methods tend to destroy desirable surface properties of the films. Therefore, the methods often include an additional surface treatment step after embossing to restore some of the surface properties of the oriented film.

SUMMARY OF THE INVENTION

Briefly, in one aspect of the present inventions, an embossed oriented thermoplastic film is provided comprising an oriented thermoplastic film having first and second major surfaces and a plurality of embossments on at least one of the first and second major surfaces wherein the tensile strength-at-break and tensile elongation-at-break of the embossed oriented thermoplastic film are substantially the same as the tensile strength-at-break and tensile elongation-at-break of the unembossed oriented thermoplastic film.

In another aspect, this invention is the method of making an embossed oriented thermoplastic film comprising the steps of providing an oriented thermoplastic film having first and second major surfaces, softening at least one of the first and second major surfaces to produce a softened surface, embossing the softened surface to produce an embossed oriented thermoplastic film, and cooling the embossed oriented thermoplastic film. In a preferred embodiment the combined steps of softening, embossing, and cooling occur in less than 1 second.

In a preferred embodiment, a heat flux is provided by a flame to at least one major surface of an oriented thermoplastic film resulting in a softened surface. The film then is passed between a nip having at least one embossing surface to form embossments on the film. This embossed surface is then cooled to fix the structure of the embossments. The time required to heat, emboss, and cool the embossed oriented thermoplastic film ranges from about 0.05 to about 1 second.

The resultant embossed oriented film has substantially the same bulk mechanical properties of the oriented film before embossing. This method imparts variable topography to an oriented film that leads to variation in such characteristics as gloss, friction, and mechanical adhesion. Further, when the softening step is carried out by flame treatment, this method imparts additional desirable surface characteristics such as improved wetting and chemical adhesion to subsequent coatings. Thus, in a method of this invention, the film is surface treated and embossed in one high-speed operation.

In yet another aspect, this invention is a layered construction comprising an oriented thermoplastic film having first and second major surfaces and a plurality of embossments on at least one of the first and second major surfaces, wherein the tensile strength-at-break and tensile elongation-at-break of the embossed oriented thermoplastic film are substantially the same as the tensile strength-at-break and tensile elongation-at-break of the oriented thermoplastic film before embossing.

In yet another aspect, this invention is a method of making a thermoplastic article by providing a layered construction comprising an oriented thermoplastic film having a major surface, softening the major surface to produce a softened surface, embossing the softened surface to produce an embossed layered construction, and cooling the embossed layered construction, wherein the tensile strength-at-break and tensile elongation-at-break of the oriented thermoplastic film in the embossed layered construction are substantially the same as the tensile strength-at-break and tensile elongation-at-break of the oriented thermoplastic film in the layered construction before embossing.

In this application, "tensile strength-at-break and tensile elongation-at-break of the embossed oriented thermoplastic film are substantially the same as the tensile strength-at-break and tensile elongation-at-break of the unembossed oriented thermoplastic film" means that the tensile strength-at-break of the embossed oriented thermoplastic film has a variance of less than 10 percent from the tensile strength-at-break of the unembossed oriented thermoplastic film and the tensile elongation-at-break of the embossed oriented thermoplastic film has a variance of less than 10 percent from the tensile elongation-at-break of the unembossed oriented thermoplastic film. Preferably the tensile strength-at-break has a variance of less than 5 percent and/or the tensile elongation-at-break has a variance of less than 5 percent. More preferably there is essentially no change in these properties after embossing.

DESCRIPTION OF THE PREFERRED EMBODIMENTS

Figure 1:
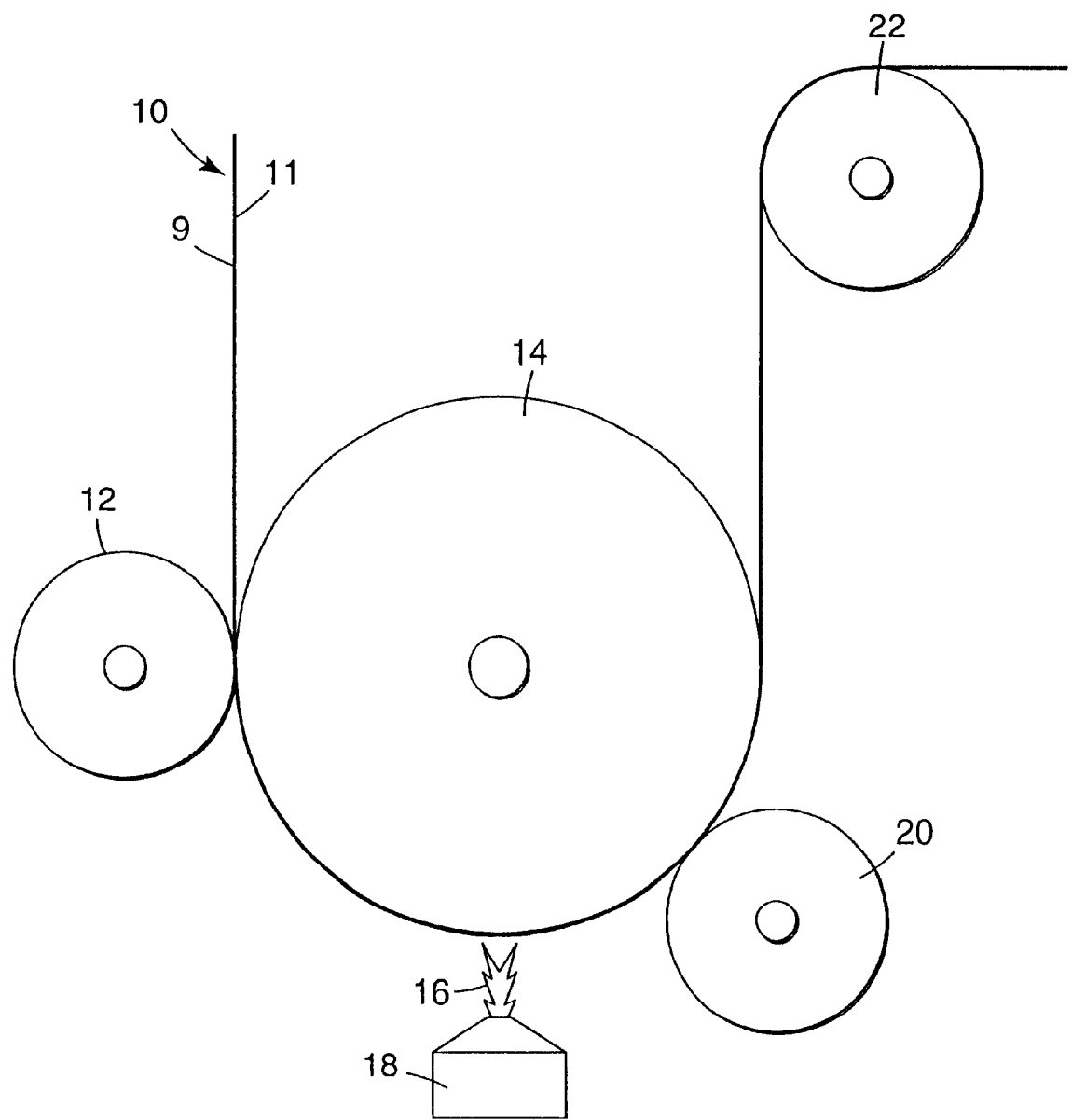
FIG. 1 is a schematic representation of one embodiment of the method of this invention.

The present invention provides an embossed oriented thermoplastic film and a method of making such film. A wide range of oriented thermoplastic polymer films are suitable in the practice of this invention. "Film" refers to planar forms of plastic, thick enough to be self-supporting but thin enough to be flexed, folded, or creased without cracking. Film thickness depends upon desired applications and manufacturing methods. "Oriented" refers to a polymer film that has been stretched in at least one direction to align the polymer molecules; thus generally increasing the tensile strength-at-break and decreasing the elongation-at-break of the polymer film in the direction of orientation over that of the un-stretched polymer film.

"Thermoplastic" refers to polymers that soften when exposed to heat and return to their original condition when cooled. Natural substances that exhibit this behavior are crude rubber and a number of waxes. However, the term is usually applied to synthetic polymers as described below. These polymers are distinct from "thermoset" polymers that cure or "set", typically upon exposure to activating radiation such as heat or light, and thus cannot be subsequently softened by heating.

A distinction to be made among thermoplastic polymers used to make films is that some polymers are amorphous and some are semi-crystalline. That is, an amorphous polymer has no long range order as can be determined, for example, by wide-angle X-ray scattering. A further distinction for amorphous polymers is that some are amorphous rubbery polymers, having a glass transition temperature ($T_g$) below their use temperature, and others are amorphous glassy polymers, having a $T_g$ above their use temperature. Amorphous rubbery polymers are also referred to as "elastomers". Elastomer is a term referring to polymers having properties similar to those of vulcanized natural rubber, namely the ability to be stretched to at least twice their original length and to retract very rapidly to approximately their original length when released. The term includes uncrosslinked polyolefins that are thermoplastic; these are referred to as thermoplastic olefin rubbers. The mechanical properties of amorphous rubber polymers are typically unaffected by orientation and are unaffected by heat or heating followed by cooling.

Amorphous glassy polymers have no well-defined melting point. In contrast to homogeneous amorphous glassy polymers, semi-crystalline polymers are morphologically heterogeneous, having crystalline regions and amorphous regions; they exhibit distinct, reversible melting points. The existence of crystalline regions in semi-crystalline polymers can be detected by methods such as wide-angle X-ray scattering. These polymers can be oriented to increase their tensile strength-at-break and decrease their elongation-at-break. However, heat can also relax the orientation and reduce the beneficial property enhancements obtained by orientation, if heating occurs for a sufficient length of time.

Polymers suitable for use in this invention exhibit a softening transition (either a melting point or a glass transition) above use temperature and they are capable of being formed into oriented films. Amorphous glassy thermoplastic films and semi-crystalline thermoplastic films are suitable for use in making embossed oriented films by the method of this invention.

Oriented thermoplastic polymer films are prepared by methods known in the art, such as heating the polymer to a temperature near or above the softening transition temperature, followed by stretching in one or more directions. Typically, a polymer sheet is extruded (also referred to as "melt extruded") and then oriented by rapid stretching at a desired temperature to form an oriented film, followed by rapid quenching. Quenching ensures that the orientation is not lost by molecular relaxation. Orientation can occur in the direction of film motion, referred to in the art as the machine direction or the longitudinal direction. Films may be oriented in one direction only; such are referred to as uniaxially oriented films. They may also be oriented in two directions, typically orthogonal to each other, and are referred to as biaxially oriented films. The direction orthogonal to the longitudinal direction is referred to as the transverse direction. Mechanical properties of oriented films vary depending upon the direction and degree of orientation and are often referenced to the longitudinal and transverse directions. Orientation typically produces stiffer films with increased modulus, decreased elongation-at-break and increased tensile strength-at-break.

Suitable oriented amorphous glassy thermoplastic films include those comprising acetates such as cellulose acetate, cellulose triacetate and cellulose acetatelbutyrate, acrylics such as poly(methyl methacrylate) and poly(ethyl methacrylate), polystyrenes such as poly(p-styrene) and syndiotactic-polystyrene, and styrene-based copolymers, vinylics such as poly(vinyl chloride), poly(vinylidene chloride), poly(vinylidene fluoride), poly(vinylidone dichloride) and mixtures thereof.

Preferred oriented amorphous glassy thermoplastic films are those comprising cellulose acetate, poly(p-styrene), syndiotactic polystyrene, poly(vinyl chloride), poly(vinylidene chloride), poly(vinylidene fluoride) and poly(vinylidone dichloride).

Suitable oriented semi-crystalline thermoplastic films include those comprising polyolefin homopolymers such as polyethylene and polypropylene, copolymers of ethylene, propylene and/or 1-butylene; copolymers containing ethylene such as ethylene vinyl acetate and ethylene acrylic acid; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; and mixtures thereof.

Preferred oriented semi-crystalline polymer films are those comprising polyethylene, polypropylene, poly(ethylene/propylene), poly(ethylene/1-butylene), poly(propylene/1-butylene), poly(ethylene/propylene/1-butylene), poly(ethylene terephthalate), poly(ethylene butyrate), poly(ethylene napthalate), and mixtures thereof. Particularly preferred films are those comprising linear-low-density polyethylene, high-density polyethylene, ultra-high-molecular-weight polyethylene, isotactic polypropylene, blends of isotactic polypropylene and substantially syndiotactic polypropylene and blends of isotactic polypropylene and polyethylene.

A preferred biaxially oriented semi-crystalline polymer film comprises isotactic polypropylene, also referred to as biaxially oriented polypropylene (BOPP).

The oriented thermoplastic polymer films useful in this invention typically range in thickness from about 2 to about 250 micrometers. Preferably, they range in thickness from about 5 to about 150 micrometers, and more preferably, from about 10 to about 75 micrometers.

The oriented thermoplastic polymer films useful in this invention may contain fillers, plasticizers, colorants, lubricants, processing aids, nucleating agents, ultraviolet-light stabilizing agents, and other property modifiers. Typically such materials are added to a polymer before it is made into an oriented film (e.g., in the polymer melt before extrusion into a film). Organic fillers may include organic dyes and resins, as well as organic fibers such as nylon and polyimide fibers. Inorganic fillers may include pigments, fumed silica, calcium carbonate, talc, diatomaceous earth, titanium dioxide, carbon fibers, carbon black, glass beads, glass bubbles, mineral fibers, clay particles, metal particles and the like. Filler may be added in amounts up to about 100 parts per 100 parts of the polymer forming the oriented film. Other additives such as flame retardants, stabilizers, antioxidants, compatibilizers, antimicrobial agents (e.g., zinc oxide), electrical conductors, and thermal conductors (e.g., aluminum oxide, boron nitride, aluminum nitride, and nickel particles) can be blended into the polymer used to form the film in amounts of from about 1 to about 50 volume percent.

In the method of this invention, a layered construction, also known as a multilayered film, may be used as the input film. Such films include, for example, layers of films that are formed by co-extrusion with one or more other polymers, films coated with another layer, or films laminated or adhered together. The major surface of the oriented thermoplastic film comprises the layer that is to be softened, embossed, and cooled.

The embossed oriented thermoplastic films of this invention may be made into layered constructions with other films. Such films may be oriented thermoplastic films or may be unoriented thermoplastic films. Such would include amorphous rubbery, amorphous glassy, and semi-crystalline films. Layers which serve as backing layers could also be used. Backings could be in the form of single or multilayered films, porous films, foam-like films, woven or nonwoven materials, metal foils, and combinations of the foregoing. Layers comprising adhesive could also be used in a layered construction. Adhesives could be hot-melt, having substantially no tack at room temperature, or pressure-sensitive, having a balance of shear and adhesive properties at room temperature. Pressure-sensitive adhesives include, for example, acrylic, segmented block copolymer, rubber, α-olefin, silicone, polyvinyl ether, and urethane. A particularly useful adhesive may comprise acrylic adhesive (isooctyl acrylate (95%)/acrylic acid(4.5%)). Preferably, the layer of pressure sensitive adhesive is uniform and has an adhesion to glass of less than 17 grams/millimeter. Adhesives for use with this invention are described in U.S. Pat. Nos. 4,699,842; 3,578,622; 3,331,729; 2,926,105; and 4,835,217.

In the method of this invention, an oriented thermoplastic film having a first and second major surface is provided. The thermoplastic film moves between or over rollers or the like that serve to control the film tension. At least one of the first and second major surfaces of the film is exposed to a heat flux from a heat source such as a flame, a plasma torch, and the like. Heat sources result in a softened surface in the desired time frame, that is, rapidly enough to cause softening of the film surface without causing a significant change in the orientation and/or properties of the bulk film. A preferred heat source is a flame. Heat flux causes the surface of the film to soften.

The film may move over a support, such as a backing roll, while being exposed to the source of heat. A support for the film can minimize distortion of the film during heating. The heat source provides sufficient heat to the surface of the oriented thermoplastic film to soften the surface as necessary for embossing. Embossing can be carried out by any means known in the art. The preferred method of embossing is to move the softened film through a nip having an embossing surface. "Nip" refers to two rolls in proximity that apply pressure on a film when the film passes between them. The embossing surface contacts the film with sufficient force to create embossments in the softened surface of the film. The embossed film is then cooled by any of a number of methods to reduce the temperature of the softened surface to below its softening temperature before the softened film has experienced a significant change in bulk properties resulting from prior orientation. Such methods include moving the film over one or more chilled rollers, delivering it to a water bath, or cooling by air or other gases, such as by use of an air knife.

This invention allows heating the full thickness of the film to the softening temperature, embossing, and cooling the film below the softening temperature while retaining the bulk mechanical properties of the input film.

In this application, "dwell time" is defined as the time it takes for the combined steps of softening, embossing, and cooling the film. Dwell time will vary depending upon the configuration (e.g., equipment size and film speed) of the system used to heat, emboss, and cool the film. The time of exposure to heat should be sufficient to soften the surface of the oriented thermoplastic film prior to contact with the embossing roll and the dwell time should not be so long as to cause destruction of the mechanical properties of the film. Thus, in preferred embodiments, the dwell time is as short as possible.

An embodiment of the method of this invention is illustrated in FIG. 1. Oriented thermoplastic film 10 having major surfaces 9 and 11 is passed between nip roll 12 and backing roll 14 to control the tension on the film, but other methods to control the tension can also be used. Both nip roll 12 and backing roll 14 are covered with a smooth layer that ensures intimate contact between rolls 12 and 14 and film 10. Suitable covering layers for the backing roll and the nip roll include elastomers such as neoprene, nitrile rubber, silicone rubber, polyether urethane rubber, chlorosulfonated rubber, polytetrafluoroethylene (PTFE), and the like. The temperature of either or both rolls can be controlled, for example by means of a water recirculation system.

Major surface 9 of film 10 moves over flame 16 provided by ribbon burner 18. Rapid heating of film 10 occurs. Film 10 is transported between backing roll 14 and male-patterned metal-plated embossing roll 20 to form an embossed surface of film 10 having a reverse pattern of that machined into embossing roll 20, such that indentations are formed in major surface 9 and corresponding protrusions are formed in major surface 11.

Embossing roll 20 is forced against backing roll 14 by means of pneumatic or hydraulic cylinders and lever mechanisms as are known in the art. The force applied to embossing roll 20 is controlled by varying pressure to the cylinders and by varying the width of contact between embossing roll 20 and backing roll 14. Typically the force applied to embossing roll 20 varies from about 17.5 to about 1050 N/lineal cm (10 to about 600 pounds/lineal inch). The applied force should be sufficient to emboss a desired pattern into the thermoplastic film. The temperature of embossing roll 20 is preferably maintained at room temperature, i.e., about 25° C., or below.

Film 10 is then cooled by moving over water cooled chill roll 22. Those skilled in the art recognize that other cooling means can be used. For example, an air knife, evaporating liquid nitrogen, or a water bath could be used to cool the surface of the thermoplastic film as it leaves the embossing roll.

The time for a point on surface 9 to be softened as it moves over flame 16, through backing roll 14 and embossing roll 20 and to be cooled below its softening point as it moves over chill roll 22 is the "dwell time". The dwell time typically ranges from about 0.05 seconds to about 1 second and preferably ranges from about 0.1 to about 0.3 seconds. The time of exposure to the heat from the flame should be sufficient to soften the oriented thermoplastic film prior to contact with the embossing roll and the dwell time should not be so long as to cause destruction of the mechanical properties of the film.

Flame burner 18 ordinarily uses premixed flames in which the fuel and oxidizer are thoroughly mixed prior to combustion and the rate of combustion is controlled by the rate of chemical reactions that occurs in the flame. In a premixed flame, the luminous region is that portion of the flame where the temperature rise is the greatest and where much of the reaction and heat release occur. To rapidly heat a polymer film to elevated temperatures, both premixed and diffusion flames can be used. In a diffusion flame, separate fuel and oxidizer streams come together through molecular and turbulent diffusion. In diffusion flames, the rate of combustion is controlled by the rate of mixing of the reactants. Unlike premixed flames, which typically have a narrow, 1–2 mm wide reaction zone, diffusion flames have a wider region through which the chemical composition changes and chemical reaction takes place. Both premixed and diffusion flames can be either laminar or turbulent.

Flames are commonly described in terms of two characteristics: flame power and molar ratio of oxidizer to fuel. Flame power is the product of the volume of fuel burned per unit time and the heat content of the fuel. Typical units for flame power are W or Btu/hr. In flame treating, flame power can be normalized to account for the dimensions of the burner, leading to units such as $W/cm^2$ or $Btu/hr-in^2$. The exact ratio of oxidizer to fuel needed for complete combustion is known as the stoichiometric ratio. For example, the exact amount of dry air necessary for the complete combustion of methane is 9.55 volumes per volume of methane. As an example, the stoichiometric ratio for an air:methane flame is 9.55:1. The equivalence ratio is defined as the stoichiometric oxidizer:fuel ratio divided by the actual oxidizer:fuel ratio. For fuel-lean flames, there is more than the stoichiometric amount of oxidizer and so the equivalence ratio is less than 1.00. For oxidizer:fuel mixtures at the stoichiometric ratio, the equivalence ratio is exactly 1.00. For fuel-rich systems, the equivalence ratio is greater than 1.00.

Flame treating equipment useful for this invention is any that can provide a flame in close proximity to the polymer surface. Generally, the film surface is flame treated as the film moves over a cooled support, e.g., a cooled roll, to prevent film distortion. Flame treating equipment includes commercial systems manufactured by, for example, The Aerogen Company, Ltd., Alton, United Kingdom, and Sherman Treaters Ltd., Thame, United Kingdom. Preferably the equipment has a mixer to combine an oxidizer with fuel. A ribbon burner is best suited for the flame treatment of polymer films, but other types of burners may also be used.

The flame has an optimal distance from the polymeric substrate surface and is supported by a mixture of oxidizer and fuel. The distance between the tip of the luminous cone of the flame and the surface of the polymer ranges between about 30 mm to about −2 mm, i.e., the film is contacted by the flame and occupies space that would otherwise comprise the terminal 2 mm of the flame tip. Preferably the distance is between 0 mm and 10 mm. The fuel has a lower electronegativity than the oxidizer. Suitable fuels include, for example, natural gas, methane, ethane, propane, butane, ethylene, liquefied petroleum gas, acetylene, carbon monoxide, dimethyl ether, ammonia, and blends thereof. Suitable oxidizers include air, oxygen-enriched air, and nitrous oxide-enriched air. The oxidizer reacts with the fuel to form chemical species that may react with the surface of the thermoplastic film.

Figure 2:
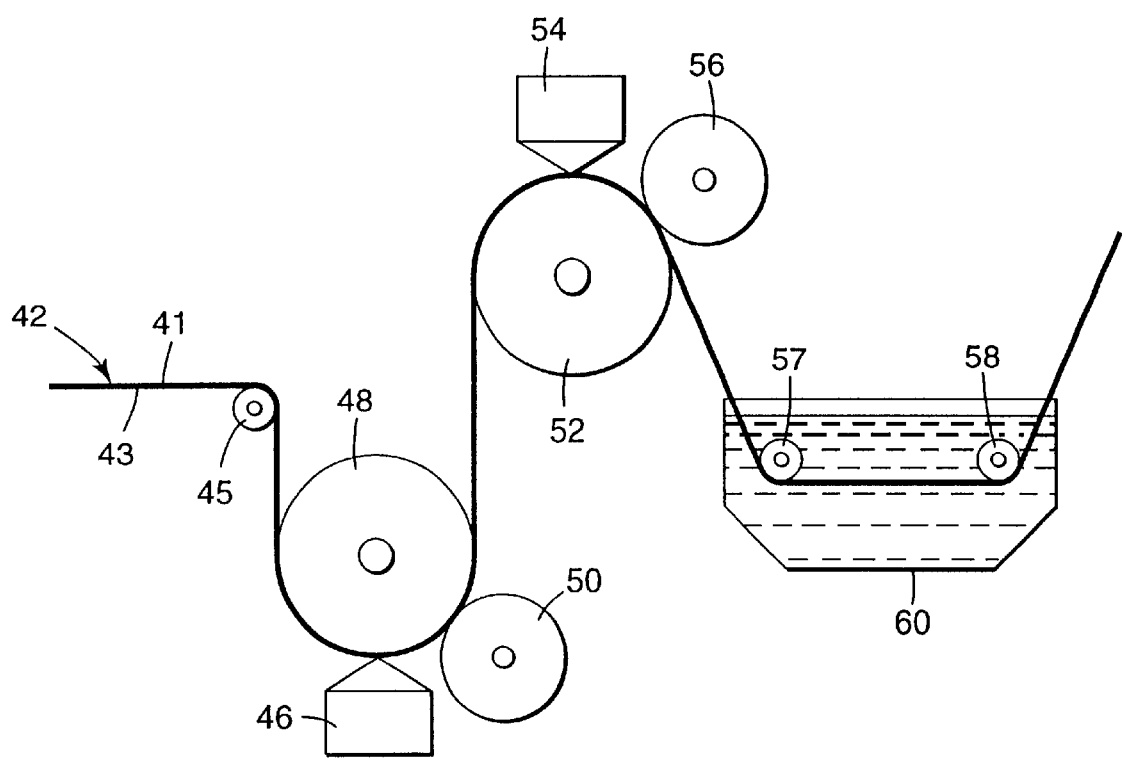
FIG. 2 is a schematic representation of another embodiment of the method of this invention.

Turning now to FIG. 2, another embodiment of the method of this invention is shown. In this embodiment, both major surfaces of the oriented thermoplastic film are softened and embossed. Oriented thermoplastic film 42 having major surfaces 41 and 43 moves over idler roll 45 which serves to control the tension of the film. Film 42 is transported to backing roll 48. Major surface 43 of film 42 moves over heat source 46. Suitable heat sources include a plasma torch and a flame, provided, for example, by a ribbon burner. Rapid heating of major surface 43 occurs. Film 42 is transported between backing roll 48 and male-patterned embossing roll 50 to produce embossments on major surface 43. Film 42 is transported to second backing roll 52 arranged so that major surface 41 moves proximate to second heat source 54. Heat source 54 may the same type as heat source 46, or may be a different type of heat source. Rapid heating of major surface 41 occurs. Film 42 is then transported between backing roll 52 and embossing roll 56 to produce embossments on major surface 41. Film 42 proceeds to idler rolls 57 and 58 that hold the film in tension while it goes through water bath 60. An air knife would also be suitable cooling means and could be substituted for the water bath.

Returning now to the method of this invention, embossing refers to a process in which a pattern is impressed into the surface of an article. Embossing is typically accomplished by means of a male pattern formed on a hard material such as a metal layer on an embossing roll, as depicted by 20 in FIG. 1. Those skilled in the art recognize that embossing can be done by several methods, including the use of a continuous tooled belt or sleeve. Preferred metal layers include those comprising nickel, copper, steel, and stainless steel. Patterns are typically machined into the metal layer and can have a wide variety of sizes and shapes. Any pattern that can be scribed into a metal surface can be used in the practice of this invention. "Pattern" does not necessarily refer to a regular repeating array, but may mean a random array of features having the same or different sizes. Patterns suitable for the practice of this invention include four-sided square pyramids, truncated four-sided square pyramids, cones, straight lines, wavy lines, and the like and are machined into at least a portion of the embossing roll. An individual feature of the pattern is referred to as an embossment. The number and spacing of embossments, as well as the nature of the individual embossment, such as its depth, degree of sharp reflecting edges, and shape can be varied as desired.

As exemplified below, a plurality of embossments are formed on the oriented thermoplastic film. There are typically about 10 to about 150 embossments per lineal centimeter (25–400 per lineal inch). The embossments can be of any suitable depth, as long as the mechanical properties of the films are substantially retained after the embossments have been formed. The depth of an embossment typically ranges from greater than zero to about 90 percent of the thickness of the oriented thermoplastic film. In the patterns exemplified below, the depth of an embossment ranges from about 1.0 $\mu$m to about 200 $\mu$m, preferably from about 2.0 $\mu$m to about 20 $\mu$m, and more preferably from about 4.0 $\mu$m to about 10 $\mu$m.

Figure 3:
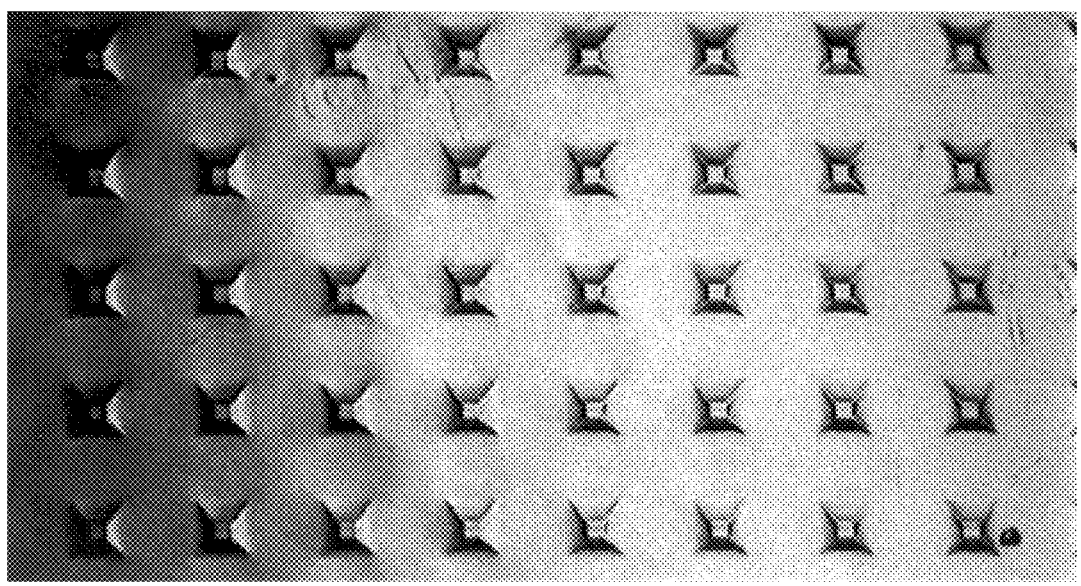
FIG. 3 is a digital image at 200× magnification of the film surface of one embodiment of this invention.

FIG. 3 shows the film surface of one embodiment of this invention. The base film was a 50 $\mu$m (2 mil) biaxially oriented polypropylene. The embossing pattern was a regular array of truncated square pyramids having about 70 features per lineal cm (about 175 per lineal inch).

Regardless of the embossing pattern, the bulk mechanical properties of the embossed oriented thermoplastic film are substantially the same as those of the oriented thermoplastic film. That is, the tensile strength-at-break of the embossed oriented thermoplastic film has a variance of less than 10 percent from the tensile strength-at-break of the unembossed oriented thermoplastic film and the tensile elongation-at-break of the embossed oriented thermoplastic film has a variance of less than 10 percent from the tensile elongation-at-break of the unembossed oriented thermoplastic film. Preferably the tensile strength-at-break has a variance of less than 5 percent and/or the tensile elongation-at-break has a variance of less than 5 percent. More preferably there is essentially no change in these properties after embossing.

It is believed that the bulk mechanical properties do not change substantially because the oriented thermoplastic film spends only a short time at elevated temperatures. Time is an important consideration, because heating at or above the softening temperature of the polymer for prolonged periods can cause loss of orientation, and hence, loss of desirable mechanical properties. Avoiding conditions sufficient to melt the polymer is also advantageous, since molten polymer adheres to the embossing rolls and results in significant damage to the polymer film. In addition, the mechanical properties of the film are significantly altered if melting occurs because the polymer chains making up the oriented polymer have increased mobility and sufficient time to lose their orientation.

When a polymeric film is oriented, the tensile strength-at-break in the direction of orientation is significantly increased and the elongation-to-break in the oriented direction is significantly reduced. This results in a film that is significantly stronger than its unoriented counterpart. Significant bulk mechanical properties of oriented thermoplastic films include stress properties, such as tensile strength-at-break, and strain properties such as percent elongation-at-break. These properties are measured on films conditioned for 24 hours at 22° C. (72° F.) and 50% relative humidity (RH). Measurements are performed on film strips cut from the longitudinal direction and from the transverse direction of the film, since the values may vary depending upon the degree of orientation of the film. For example, a typical biaxially oriented polypropylene film has a tensile strength-at-break of about 144 N/mm$^2$ (20,000 psi) in the longitudinal direction and of about 280 N/mm$^2$ (39,000 psi) in the transverse direction.

When an oriented thermoplastic film is softened for a prolonged period of time or is melted, the oriented and ordered regions tend to become disordered. This often results in a decrease in tensile strength-at-break and an increase in elongation-at-break if the disorder is substantial. However, it is not uncommon to observe increases in tensile strength-at-break and/or decreases in elongation-at-break when the disorder is not substantial, i.e., less than about 10% change from the unembossed state.

Tensile strength-at-break is a measure of the force on the film strip at the time of rupture divided by the original cross-sectional area of the test strip. Percent elongation-at-break is a measure of the change in length of the film strip at the time of rupture divided by the original length of the test strip and multiplied by 100. Measurement of these properties before and after embossing a film, whether by the process of this invention or by other processes described in the art, provides an understanding of the effect of various processes on the mechanical properties of a film.

When the source of heat is a flame, the method of this invention provides a means of both embossing and treating the surface of an oriented thermoplastic polymer film. That is, "treating" means that both the wetting and adhesion characteristics of the polymer can be improved. This is because a flame is both a source of heat and of active chemical species, and so not only heats the polymer film but also oxidizes, or otherwise chemically modifies, the surface of the film.

The process of this invention also provides various surface topographies. Changes to the topography can be useful in producing surfaces that have desirable release, adhesion, or gloss properties.

Gloss is an important property for some applications of embossed oriented thermoplastic film. Gloss is a measure of the light reflected from the film surface at the specular angle, the angle equal and opposite to the angle of the incident light source. To arrive at a specific gloss level on, for example, an oriented polypropylene film, embossing is conducted to cause intentional defects in the glossy surface of the film, thereby reducing the ratio of specular reflectance to diffuse reflectance. This ratio is affected by the number and spacing of embossments, as well as by the nature of the individual embossment, such as its depth, degree of sharp reflecting edges, and shape. A patterned nip roll is fabricated to provide the correct balance of specular reflectance to diffuse reflectance. Reductions in specular gloss can be accomplished by, for example, holding the type of pattern constant, while varying the depth and spacing of the pattern. In this way, the specular reflectance decreases with an increasing amount of diffuse reflecting asperities.

The embossed oriented thermoplastic films of this invention may be used as stand-alone or self-supporting films or may be made into constructions with other layers. The embossed oriented thermoplastic films are useful as components of products including adhesive tapes, release liners, photographic or imaging films, and magnetic storage media and the like.

EXAMPLES

This invention is further illustrated by the following examples that are not intended to limit the scope of the invention.

Test Methods
Film Tensile Property Determinations

The tensile strength-at-break and tensile elongation-at-break of the films were measured by the procedures described in ASTM D-882, "Tensile Properties of Thin Plastic Sheeting", Method A. The films were conditioned for 24 hours at 22° C. (72° F.) and 50 percent relative humidity (RH). The tests were performed using a tensile-testing machine commercially available as a Model No. 4502 from Instron Corp., Canton, Mass. Specimens for this test were 1.25 cm in width and 15 cm in length. An initial jaw separation of 5 cm and a crosshead speed of 30 cm/min were used. Ten specimens were tested for each sample, five in the longitudinal direction (LD) (i.e., machine direction) and five in the transverse direction (TD).

Tensile values are reported in Table 2. The difference in the tensile strength-at-break and the tensile elongation-at-break between unembossed film and embossed film is expressed as "delta" and reported as a percentage. Delta is calculated by subtracting the value (of the tensile strength-at-break or the tensile elongation-at-break) of an embossed oriented film from the value of an unembossed oriented film, and dividing by the value of the unembossed oriented film (i.e., (unembossed oriented film−embossed oriented film) ÷unembossed oriented film) and multiplying by 100.

Gloss Determination

Gloss is a measure of the light reflected from the film surface at the specular angle, that is, the angle equal and opposite to the angle of the incident light source. Gloss was measured according to the procedures described in ASTM D-2457, "Test for Specular Gloss of Plastic Films" using a gloss meter at a 60° measurement angle (commercially available under the trade designation "ProGloss Pro-3" from Hunter Associates Lab, Reston, Va). Because all of the samples were transparent, a matte-black backing surface was placed beneath each test specimen prior to the measurements. Five measurements were made for each film sample to obtain an average percent gloss.

Surface Topography Determination

The topography of the embossed films was determined using a surface roughness measuring device (commercially available as Model RST Plus from Wyko Corporation of Tucson, Ariz.). This device uses the technique of vertical scanning interferometry (VSI) to determine roughness. In this technique, light reflected from a reference mirror combines with light reflected from the sample surface to produce interference fringes. The roughness measuring device measures the degree of fringe modulation, or coherence. A computer algorithm processes fringe-modulation data from the intensity of the reflected light to calculate surface heights. Using this technique, the vertical resolution from a single measurement is 3 nm. A 10.3× interferometer objective was used to examine a film surface area of about 454 µm by about 606 µm. The data was corrected for possible tilt (nonplanar alignment) of the sample using an algorithm supplied with the interferometer. Another computer algorithm calculates the average and total roughness heights. The total roughness height, $R_t$, is the greatest peak-to-valley profile distance in the analyzed area. $R_t$ corresponds to the maximum depth of the embossments, or height of protuberances above a reference plane.

Wetting Test

Estimation of the wetting tension of a polymer film surface is made by wiping a series of liquids of different surface tensions over different regions of the surface of a polymer film sample according to ASTM D-2578, "Wetting Tension of Polyethylene and Polypropylene Films." The wetting tension of the film surface is approximated by the surface tension of the liquid that just wets the film surface. The untreated polypropylene and untreated poly(ethylene terephthalate) (PET) films used in this study had ASTM wetting test values of 29 $mJ/m_2$ and 48 $mJ/m_2$, respectively.

Surface Composition Determination

X-ray photoelectron spectroscopy (XPS or ESCA) was performed on a spectrometer using a monochromatic $AlK_\alpha$ photon source at an electron take-off angle with respect to the surface of 38° (Model 5950A available from Hewlett-Packard, Palo Alto, Calif.). Spectra were referenced with respect to the 285.0 eV carbon 1s level observed for hydrocarbon. From the ESCA spectra, O/C atomic ratios were obtained. The typical standard deviation of the O/C ratios obtained from ESCA was ±0.02.

Example 1

This example illustrates the preparation of an embossed oriented polypropylene film.

A combustible mixture was formed by mixing together an oxidizer comprised of dust-filtered compressed air (at 25° C., having a dew point of less than about −10° C.) with a natural gas fuel in a venturi mixer (Flowmixer Model 88-9 available from Pyronics Inc., Cleveland, Ohio). The natural gas fuel had a specific gravity of 0.577; a stoichiometric ratio for dry air: natural gas of 9.6:1, and a heat content of 37.3 kJ/L. The flow rates of the air and natural gas were measured with flowmeters (Model 5812 (8–400 Lpm) and Model 5811 (1–50 Lpm)) (both available from Brooks Instrument, Hatfield, Pa.). The mass flowmeters were calibrated using in-line cumulative-flow meters that operate on the displacement principle (available from Rockwell International, Pittsburgh, Pa.). The natural gas and air flows were controlled with control valves (available from Badger Meter Inc., Tulsa, Okla.). All flows were adjusted to result in a flame equivalence ratio of 1.00 and a normalized flame power of 580 $W/cm^2$. The combustible mixture passed through a pipe to a ribbon burner. The ribbon burner was a 35 cm×1 cm stainless steel ribbon mounted in a cast-iron housing (available as Part No. FMB-206 from The Aerogen Company Ltd., Alton, United Kingdom).

The burner was mounted directly beneath a 25 cm-diameter, 40 cm-face-width steel chill roll (manufactured by F. R. Gross Co., Stow, Ohio). The chill roll had a 6 mm-thick covering of silicone elastomer (No. FS-8725, having a Shore A Durometer of 80–90, available from American Roller Co., Kansasville, Wis.). The backing roll was held at 30° C. by means of a water-recirculation system (commercially available under the trade designation "STERLCO" from Sterling Inc., Milwaukee, Wis.). An electric spark ignited the combustible mixture. Stable conical flames were formed with tips 2–3 mm above the topmost surface of the ribbon burner. The input film was thermally extruded, biaxially oriented homopolymer polypropylene (BOPP) film (0.049 mm (1.9 mil) average thickness, 30 cm wide). The film, moving at 120 meters/min (m/min), was guided by idler rolls to the backing roll. The distance between the uppermost surface of the ribbon burner and the backing roll was adjusted to maintain a distance of 6–8 mm between the tips of the luminous stable flame cones and the surface of the BOPP film. To insure intimate contact between the substrate and the backing roll, a 10 cm-diameter, 40 cm-face-width nip roll, covered with polyether urethane elastomer (80–90 Shore A Durometer, from American Roller Co.), was located at the 9 o'clock position on the input side of the backing roll as the film moved counterclockwise from left to right. The front side of the BOPP film was exposed to the laminar premixed flame while the back side was cooled by contact with the elastomer-covered backing roll.

After exposure to the flame, the BOPP film was embossed by contact with a 10 cm-diameter, 40 cm-face-width embossing nip roll located at the 4 o'clock position on the output side of the backing roll. The zone where heating of the BOPP film occurred was essentially between the inbound nip and the outbound embossing nip, or about 40% of the circumference of the backing roll. Using this value as the dimension of the heating zone, the exposure time of the BOPP film to the heat of the flame was about 0.15 seconds. The dwell time, that is, the time of the combined steps of heating the film surface by the flame, embossing the film by contacting it with the embossing roll, and cooling the film surface below its softening temperature, was about 0.3 seconds.

The embossing nip roll consisted of a water-cooled steel core plated with a 0.9 mm thick coating of electroless copper that had a male-pattern cut into the copper. The pattern was cut into the central 5 cm of the nip roll, while the copper coating on the 17.5 cm of unpatterned nip-roll face on either side of the male pattern was reduced to a thickness of 0.5 mm. This caused the patterned portion of the embossing nip roll to be the only area of contact between the nip roll and the backing roll. The pattern was a truncated square pyramid with a base dimension of approximately 0.14 mm and a top dimension of approximately 0.03 mm, with 50 pyramids per centimeter of face width. The temperature of the embossing nip roll was held at 25° C. by a water-recirculation system (Sterlco). The embossing nip roll was forced against the film and backing roll by means of pressurized air cylinders that applied a total of about 1100 Newtons (N) (250 pounds-force (lbf.)) against the backing roll, resulting in a force of about 220 Newtons-per-lineal-centimeter (N/cm) (125 pounds force-per-lineal-inch (lbf./in.)) across the 5 cm face-width that contained the male embossing pattern.

The effects of flame treatment and embossing on the oriented thermoplastic film are shown by the data in the Tables below.

The data in Table 1 show that the 60° gloss of the embossed BOPP film was much less than that of the unembossed film. This reduction in gloss was caused by the presence of embossments. These embossments had a total height from peak-to-valley ($R_t$) of 6.8 micrometers ($\mu$m). As shown in Table 2, the tensile strength-at-break and the tensile elongation-at-break of the embossed BOPP film differed from the unembossed film by less than 5%, indicating the films were not substantially altered by the heating and embossing process. Finally, as shown by the wetting and ESCA data in Table 1, the embossed BOPP film had increased wettability and an increased level of surface oxidation, indicating that the BOPP film was simultaneously embossed and surface treated by the process.

Example 2

This example illustrates the preparation of an embossed oriented polymer film using the same input film as in Example 1 and similar to the procedure of Example 1, except that the backing roll was covered with a 1 mm-thick coating of polyether urethane elastomer (available as No. LK-285 from American Roller Co.). The effect of surface treatment and embossing on the oriented thermoplastic film is shown by the data in the Tables below.

Example 3

This example illustrates the preparation of an embossed biaxially oriented poly(ethylene terephthalate) film. The preparation was similar to the procedure of Example 1, except that a 25-cm-diameter, 40 cm-face-width steel chill roll having a 2 mm-thick covering of Hypalon® chlorosulfonated rubber elastomer (80–85 Shore A Durometer, from American Roller Co.) was used. The input film was 30 cm-wide, 0.014 mm (0.6 mil) thick biaxially oriented poly (ethylene terephthalate) (PET). The film speed was about 180 m/min.

After exposure to the flame, the PET was embossed by contact with a 15 cm-diameter, 40 cm-face-width embossing nip roll located at the 4 o'clock position on the output side of the backing roll. The embossing nip roll had a water-cooled steel core plated with a 0.9 mm thick coating of electroless copper that had a male pattern. The pattern was a truncated square pyramid with a base dimension of approximately 0.2 mm and a top dimension of approximately 0.06 mm, with 50 pyramids per centimeter of face width. The embossing nip roll was forced against the film and chilled backing roll by means of pressurized air cylinders that applied a total of about 41,600 N (8900 lbf.) against the backing roll, resulting in a force of about 1050 N/cm (600 lbf./in.) across the 40 cm face-width of the embossing roll.

The effects of surface treatment and embossing on the oriented thermoplastic film are shown by the data in the Tables below.

Example 4

This example illustrates the preparation of an embossed oriented thermoplastic film prepared as described in Example 1, except that the input film was 30 cm-wide 0.040 mm (1.6 mil) thick oriented polypropylene film (available from 4P Folie Forchheim GmbH, Forchheim, Germany), and the film speed was 150 m/min. The effects of surface treatment and embossing on the oriented thermoplastic film are shown by the data in the Tables below.

Comparative Example 1

The properties of an unembossed biaxially oriented polypropylene film (used as the input film of Examples 1 and 2) were measured. The results are shown in the Tables below. The properties of the film of this comparative example were compared with those of the embossed oriented films prepared as described in both Examples 1 and 2 to illustrate that softening the surface of a film and embossing it according to this method does not significantly alter the mechanical properties of the oriented film. The surface characteristics of the film, however, are changed by the process to produce lower gloss values, increased wettability, and increased level of surface oxidation. Such changes in surface characteristics are desirable for many applications.

Comparative Example 2

The properties of the unembossed biaxially oriented poly (ethylene terephthalate) (PET) film used as the input film in Example 3 were measured. The results are shown in the Tables below. The properties of the film of this comparative example were compared with those of the embossed biaxially oriented poly(ethylene) terephthalate (PET) film prepared as described in Example 3 to illustrate that softening the surface of an oriented film and embossing it does not significantly alter the mechanical properties of the oriented film. The surface characteristics of the film, however, are changed by the process to produce a lower gloss value, increased wettability, and an increased level of surface oxidation. Such changes in surface characteristics are desirable for many applications.

Comparative Example 3

The properties of the unembossed biaxially oriented polypropylene film used as the input film in Example 4 were measured. The results are shown in the Tables below. The properties of this film were compared with those of the embossed oriented polypropylene film prepared as described in Example 4 to illustrate that softening the surface of an oriented film and embossing it does not significantly alter the mechanical properties of the oriented film. The surface characteristics of the film, however, are changed by the process to produce a lower gloss value, increased wettability, and an increased level of surface oxidation.

Comparative Examples 4a and 4b

The properties of a biaxially oriented polypropylene (BOPP) film having a thickness of 50 $\mu$m (2 mils), (available from Mobil Chemical Co., Belleville, Ontario, Canada), were measured and are reported in the Tables below as Comparative Example 4a. This film was used to compare directly to the properties of a film processed according to that disclosed in Example 2 of U.S. Pat. No. 5,328,653. Example 2 of this U.S. patent describes a process for forming a thin, heat-sealable, semi-crystalline surface layer on a semi-crystalline oriented polymer. This is done by using a heated textured surface, such as a heated roll (referred to as a "hot-can"), to rapidly heat a thin layer of the oriented polymer. The texture on the heated roll is transferred to the surface layer of a film, thus embossing the film surface.

The BOPP film was moved at 23 m/min (75 fpm) over a rubber backup roll and through a nip formed by the backing roll and a textured metal roll coated with polytetrafluoroethylene (available as Teflon (TM)) that was heated to a surface temperature of 260° C. The efficient heat transfer between the heated metal roll and the BOPP film was sufficient to alter the surface and create an amorphous layer on the contact side of the BOPP film.

The mechanical property data indicate that the hot-can process (i.e., Comparative Example 4b) adversely affects the mechanical properties of an embossed oriented film. Further, the wetting properties of a film treated by the hot-can process are not improved.

When the bulk properties of the film of the unembossed oriented film (4a) were compared with those of the textured film (4b), it was evident that the process used to make the film of Comparative Example 4b caused significant heat damage to the extent that the film was embrittled. The bulk film properties are shown in Table 2 below.

Comparative Examples 5a and 5b

The properties of a commercially available unembossed biaxially oriented polypropylene film were measured and compared with those of a commercially available embossed biaxially oriented polypropylene film. The films, each having a thickness of 35 μm (1.4 mils), were obtained from 4P Folie Forchheim GmbH. Comparative Example 5a was the unembossed film. Comparative Example 5b was embossed on one major surface. The embossed finish was similar to the of the finish described in Example 1.

The tensile strength-at-break and tensile elongation-at-break of the commercially available embossed film (C5b) were significantly different from those of the unembossed film (C5a) in the transverse direction (TD). This indicated that the embossed film had significant heat damage (as compared to the commercially available unembossed film). This indicates that the process used to produce this embossed film does not substantially retain the mechanical properties of the unembossed film.

TABLE 1

Surface Characteristics of Oriented Films

| Example Number | 60° Gloss (%) | Wetting (mJ/m²) | ESCA O/C Ratio | Max Depth (μm) (R$_t$) |
|---|---|---|---|---|
| C1 | 153 | 29 | 0.00 | 0 |
| E1 | 22 | 50 | 0.12 | 6.8 |
| E2 | 30 | 44 | 0.10 | 5.4 |
| C2 | 156 | 46 | 0.40 | 0 |
| E3 | 24 | 65 | 0.56 | 6.2 |
| C3 | 146 | — | — | — |
| E4 | 32 | — | — | — |
| C4a | 143 | 29 | 0.00 | — |
| C4b | 16 | 29 | 0.00 | — |

TABLE 1-continued

Surface Characteristics of Oriented Films

| Example Number | 60° Gloss (%) | Wetting (mJ/m²) | ESCA O/C Ratio | Max Depth (μm) (R$_t$) |
|---|---|---|---|---|
| C5a | 146 | — | — | — |
| C5b | 30 | — | — | — |

TABLE 2

Bulk Mechanical Properties

| Example Number and Test Direction | Thickness (mm) | Tensile Strength-at-Break (N/mm²) | delta Tensile Strength-at-Break | Tensile Elongation-at-Break (%) | delta Tensile Elongation-at-Break (%) |
|---|---|---|---|---|---|
| E1, LD | 0.048 | 142 | −1.4 | 188 | 2.6 |
| E2, LD | 0.050 | 138 | 1.4 | 193 | 0 |
| C1, LD | 0.049 | 140 |  | 193 |  |
| E1, TD | 0.049 | 260 | 0.4 | 51 | 0 |
| E2, TD | 0.050 | 250 | 3.8 | 53 | −3.9 |
| C1, TD | 0.049 | 261 |  | 51 |  |
| E3, LD | 0.014 | 206 | −7.8 | 136 | 4.2 |
| C2, LD | 0.014 | 191 |  | 142 |  |
| E3, TD | 0.014 | 261 | 1.5 | 83 | −5.1 |
| C2, TD | 0.014 | 265 |  | 79 |  |
| E4, LD | 0.040 | 170 | −4.3 | 105 | −8.2 |
| C3, LD | 0.043 | 163 |  | 97 |  |
| E4, TD | 0.038 | 159 | 0.6 | 110 | 4.3 |
| C3, TD | 0.040 | 160 |  | 115 |  |
| C4b, LD | 0.055 | 100 | 25.0 | 205 | 5.3 |
| C4a, LD | 0.049 | 125 |  | 217 |  |
| C4b, TD | 0.054 | 206 | 18.6 | 50 | 15.2 |
| C4a, TD | 0.049 | 253 |  | 59 |  |
| C5b, LD | 0.032 | 179 | −4.1 | 100 | 3.8 |
| C5a, LD | 0.031 | 172 |  | 104 |  |
| C5b, TD | 0.032 | 150 | 18.9 | 151 | 21.8 |
| C5a, TD | 0.031 | 185 |  | 124 |  |

Example 5–8

These examples illustrate the effect of embossment depth on optical gloss.

A combustible mixture was formed as in Example 1 except that all flows were adjusted to result in a flame equivalence ratio of 0.93 (a dry air:natural gas volumetric ratio of 10.2:1) and a normalized flame power of 495 W/cm². The combustible mixture passed through a pipe to a ribbon burner (commercially available from Flynn Burner Corp., New Rochelle, N.Y.). The ribbon burner consisted of a 29.5 cm×1 cm corrugated stainless steel ribbon mounted in a brass housing. The surface of the ribbon burner was divided by packed sheets of the corrugated stainless steel into four rows of approximately elliptical gas outlets, each outlet having a major axis length of about 2 mm and a minor axis length of about 1 mm. The rows were parallel, but offset, such that the centers of the outlets were staggered to provide a more-uniform environment above the cone-shaped flames.

The burner was mounted directly beneath a 25 cm-diameter, 40 cm-face-width steel chilled backing roll (from F. R. Gross Co.). The backing roll had a 6 mm-thick covering of Hypalon® chlorosulfonated rubber elastomer (available as No. FH-57771, 80–85 Shore A durometer, from American Roller Co.). The backing roll was held at about 38° C. by means of a Sterlco water-recirculation system. An electric spark was used to ignite the combustible mixture. Stable, premixed conical flames were formed with tips between 2 and 4 mm above the topmost surface of the ribbon burner.

The input film was 30 cm-wide, thermally extruded, BOPP film with an average thickness of 35 μm (1.4 mil). The film, moving at 160 m/min, was guided by idler rolls to the elastomer-covered steel backing roll, contacting the roll at about the 9 o'clock position on the input side of the roll, which was rotating in a counterclockwise direction. The distance between the uppermost surface of the ribbon burner and the backing roll was adjusted to 10 mm. The front side of the BOPP film was exposed to the laminar premixed flame while the back side was cooled by contact with the elastomer-covered backing roll.

After exposure to the flame, the BOPP film was embossed by contact with a 10 cm-diameter, 40 cm-face-width embossing nip roll located at about the 4 o'clock position on the output side of the backing roll. The zone where heating of the BOPP film occurred was essentially between the 9 o'clock and 4 o'clock positions on the roll, or about 40% of the circumference of the backing roll. Using this value as the dimension of the heating zone, the exposure time of the BOPP film to the heat of the flame was about 0.05 second. The dwell time was about 0.3 second.

The embossing nip roll consisted of a water-cooled steel core plated with about 1.5 mm-thick coating of electroless copper (with a Vickers hardness of 70–90) that had a male-pattern cut into the copper. The pattern was cut into the central 30 cm of the face of the nip roll, while the copper coating on the 10 cm of unpatterned nip-roll face on either side of the male pattern was reduced to a thickness of about 0.75 mm. This caused the patterned portion of the embossing nip roll to be the only area of contact between the nip roll and the backing roll. The pattern comprised a multiplicity of truncated square pyramids with a base dimension of approximately 0.145 mm, a top dimension of 0.025 mm, and a height of about 0.075 mm, with about 69 pyramids per cm of face width. The temperature of the embossing nip roll was held at about 18° C. by the water-recirculation system. The embossing nip roll was forced against the film and backing roll by means of pressurized air cylinders that applied a total of about 35,600 N (8000 lbf.) against the backing roll, resulting in a force of about 1185 N/cm (665 lbf./in.) across the 30 cm patterned face-width of the embossing nip.

Following embossing, to reduce the temperature of the film below the softening temperature, the BOPP film was passed over two water-cooled rolls also held at about 18° C. by the water-recirculation system.

Example 6–8 illustrate the preparation of an embossed oriented thermoplastic film prepared as described in Example 5, except various process conditions were changed as indicated in Table 3.

Films of Example 5–8 that were embossed by this process had indentations generated by pressing the male tooling pattern into the softened polymer. In addition, corresponding protuberances were formed on the opposite side of the film, e.g., the side that contacted the backing roll. A maximum peak-to-valley dimension ($R_t$) could be measured on either side of the film. Generally, the $R_t$ measured on the side of the film having protuberances was less than or equal to the $R_t$ measured on the side of the film having indentations. That is, to reach a 1 μm protrusion height, an indentation depth of equal to or greater than 1 μm was generally required. It was found that the gloss and $R_t$ were more easily measured on the side of the film having protuberances. In Table 3, $R_t$ and 60° gloss are shown for the side of the embossed film having protuberances.

TABLE 3

Gloss vs. Embossment Depth

| Example | Flame Power (W/cm$^2$) | Speed (m/min) | Nip Pressure (N/cm) | 60° Gloss (%) | $R_t$ (μm) |
|---|---|---|---|---|---|
| 5 | 495 | 160 | 1185 | 63 | 6.2 |
| 6 | 495 | 200 | 890 | 103 | 3.2 |
| 7 | 395 | 160 | 890 | 92 | 3.0 |
| 8 | 495 | 160 | 890 | 74 | 4.2 |

Examples 9–10

The preparation of these examples was similar to the procedure of Example 5, except that a 35.5 cm×1 cm ribbon burner was used. In addition, the male pattern provided on the central 30 cm of the embossing nip roll comprised a multiplicity of truncated square pyramids having a base dimension of approximately 0.125 mm, a top dimension of 0.04 mm, and a height of about 0.075 mm, with about 79 pyramids per cm of face width.

The examples were tested for 60° gloss and depth of embossment. The data is reported in the table below together with that of Comparative Example 1.

TABLE 4

Gloss vs. Embossment Depth

| Example | Flame Power (W/cm$^2$) | Speed (m/min) | Nip Pressure (N/cm) | 60° Gloss (%) | $R_t$ (μm) |
|---|---|---|---|---|---|
| 9 | 500 | 160 | 1040 | 81 | 2.6 |
| 10 | 500 | 160 | 700 | 93 | 1.5 |
| C1 | N/A | N/A | N/A | 153 | 0 |

As seen in Table 3 and Table 4, the 60° gloss of embossed BOPP can be significantly less than that of a similar unembossed BOPP film, even when the maximum depth of embossments was quite small. Specifically, Example 10 illustrated a 60° gloss value of 93 with embossments having a depth of only 1.5 μm, as compared to Comparative Example 1 with a gloss value of 153. This reduction in gloss was apparent with casual observation.

Although the preferred embodiments of the invention has been discussed and described in detail, it will be appreciated that changes and modifications to the described embodiments can be made by those skilled in the art without departing from the true spirit and scope of the invention, as set forth in the claims.

We claim:

1. An embossed biaxially oriented thermoplastic film comprising:
   a biaxially oriented thermoplastic film having first and second major surfaces;
   a plurality of embossments on at least one of the first and second major surfaces, wherein a plurality of the embossments have a depth of at least 1 micrometer and wherein the tensile strength-at-break and tensile elongation-at-break of the embossed biaxially oriented thermoplastic film have a variance of less than 10 percent from the tensile strength-at-break and tensile elongation-at-break of the biaxially oriented thermoplastic film before embossing.

2. The embossed biaxially oriented thermoplastic film of claim 1 wherein the tensile strength-at-break of the embossed biaxially oriented thermoplastic film has a variance of less than 5 percent from the tensile strength-at-break of the biaxially oriented thermoplastic film before embossing.

3. The embossed biaxially oriented thermoplastic film of claim 1 wherein the tensile elongation-at-break of the embossed biaxially oriented thermoplastic film has a variance of less than 5 percent from the tensile elongation-at-break of the biaxially oriented thermoplastic film before embossing.

4. The embossed biaxially oriented thermoplastic film of claim 1 wherein a plurality of the embossments form a plurality of indentations in one major surface and a corresponding plurality of protrusions in the other major surface, said indentations having a depth and said protrusions having a height from about 2 $\mu$m to about 20 $\mu$m.

5. The embossed biaxially oriented thermoplastic film of claim 1 selected from polypropylene and polyethylene terephthalate said film having an ASTM Wetting Tension value greater than that of the film before embossing.

6. The embossed biaxially oriented thermoplastic film of claim 1 selected from polypropylene and polyethylene terephthalate said film having an oxygen/carbon atomic ratio on one surface greater than that of such surface before embossing.

7. The embossed biaxially oriented thermoplastic film of claim 1 wherein the biaxially oriented thermoplastic film comprises an amorphous glassy polymer selected from cellulose acetate, poly(p-styrene), syndiotactic polystyrene, poly(vinyl chloride), poly(vinylidene chloride), poly(vinylidene fluoride), poly(vinylidone dichloride), and mixtures thereof.

8. An embossed biaxially oriented semi-crystalline thermoplastic film comprising:

a biaxially oriented semi-crystalline thermoplastic film having first and second major surfaces;

a plurality of embossments on at least one of the first and second major surfaces, wherein a plurality of the embossments have a depth of at least 1 micrometer and wherein the tensile strength-at-break and tensile elongation-at-break of the embossed biaxially oriented semi-crystalline thermoplastic film have a variance of less than 10 percent from the tensile strength-at-break and tensile elongation-at-break of the biaxially oriented semi-crystalline thermoplastic film before embossing.

9. The embossed biaxially oriented semi-crystalline thermoplastic film of claim 8 wherein the tensile strength-at-break of the embossed biaxially oriented thermoplastic film has a variance of less than 5 percent from the tensile strength-at-break of the biaxially oriented thermoplastic film.

10. The embossed biaxially oriented semi-crystalline thermoplastic film of claim 8 wherein the tensile elongation-at-break of the embossed biaxially oriented thermoplastic film has a variance of less than 5 percent from the tensile elongation-at-break of the biaxially oriented thermoplastic film.

11. The embossed biaxially oriented semi-crystalline thermoplastic film of claim 8 wherein a plurality of the embossments have a depth from about 2 $\mu$m to about 20 $\mu$m.

12. The embossed biaxially oriented semi-crystalline thermoplastic film of claim 8 wherein the biaxially oriented semi-crystalline thermoplastic film comprises a polymer selected from polyethylene, polypropylene, poly(ethylene/propylene), poly(ethylene/1-butylene), poly(propylene/1-butylene), poly(ethylene/propylene/1-butylene), poly(polyethylene terephthalate), poly(polyethylene butyrate), poly(polyethylene napthalate), and mixtures thereof.

13. The embossed biaxially oriented semi-crystalline thermoplastic film of claim 8 wherein the biaxially oriented semi-crystalline thermoplastic film comprises a polymer selected from linear-low-density polyethylene, high-density polyethylene, ultra-high-molecular-weight polyethylene, isotactic polypropylene, blends of isotactic polypropylene and substantially syndiotactic polypropylene and blends of isotactic polypropylene and polyethylene.

14. A layered film construction comprising at least two layers at least one of which is a biaxially oriented thermoplastic film layer having first and second major surfaces having a plurality of embossments on at least one of the first and second major surfaces wherein a plurality of the embossments have a depth of at least 1 micrometer, and another layer selected from the group of thermoplastic polymer films, porous films, metal foils, woven materials, non-woven materials, and combinations thereof;

wherein the tensile strength-at-break and tensile elongation-at-break of the layered film have a variance of less than 10 percent from the tensile strength-at-break and tensile elongation-at-break of the same film without embossing.

15. The layered film construction of claim 14 further comprising an adhesive layer on at least a portion of at least one major surface of the film.

16. The layered film construction of claim 14 wherein the tensile strength-at-break of the layered film has a variance of less than 5 percent from the tensile strength-at-break of the same film without embossing.

17. The layered film construction of claim 14 wherein the tensile elongation-at-break of the layered film has a variance of less than 5 percent from the tensile elongation-at-break of the same film without embossing.

18. The layered film construction of claim 14 wherein the biaxially oriented thermoplastic film layer comprises an amorphous glassy polymer selected from cellulose acetate, poly(p-styrene), syndiotactic polystyrene,-poly(vinyl chloride), poly(vinylidene chloride), poly(vinylidene fluoride), poly(vinylidone dichloride), and mixtures thereof.

19. The layered film construction of claim 14 wherein a plurality of the embossments have a depth from about 2 $\mu$m to about 20 $\mu$m.

20. The layered film construction of claim 14 wherein the biaxially oriented thermoplastic film layer comprises a semi-crystalline polymer.

21. The layered film construction of claim 20 wherein the biaxially oriented thermoplastic film layer comprises a polymer selected from polyethylene, polypropylene, poly(ethylene/propylene), poly(ethylene/1-butylene), poly(propylene/1-butylene), poly(ethylene/propylene/1-butylene), poly(polyethylene terephthalate), poly(polyethylene butyrate), poly(polyethylene napthalate), and mixtures thereof.

22. The layered film construction of claim 20 wherein the biaxially oriented thermoplastic film layer comprises a polymer selected from linear-low-density polyethylene, high-density polyethylene, ultra-high-molecular-weight polyethylene, isotactic polypropylene, blends of isotactic polypropylene and substantially syndiotactic polypropylene and blends of isotactic polypropylene and polyethylene.

* * * * *

UNITED STATES PATENT AND TRADEMARK OFFICE
CERTIFICATE OF CORRECTION

PATENT NO. : 6,514,597 B1
DATED : February 4, 2003
INVENTOR(S) : Strobel, Joan M.

It is certified that error appears in the above-identified patent and that said Letters Patent is hereby corrected as shown below:

<u>Column 4,</u>
Line 18, delete "acetatelbutyrate" and insert in place thereof -- acetate/butyrate --.

<u>Column 11,</u>
Line 50, delete "29 mJ/m$_2$ and 48 mJ/m$_2$" and insert in place thereof
-- 29 mJ/m$^2$ and 48 mJ/m$^2$ --.

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,514,597 B1
DATED : February 4, 2003
INVENTOR(S) : Strobel, Joan M.

It is certified that error appears in the above-identified patent and that said Letters Patent is hereby corrected as shown below:

Title page,
Item [73], Assignee, delete "#M)" and insert in place thereof -- 3M --.

Signed and Sealed this

Thirtieth Day of August, 2005

JON W. DUDAS
*Director of the United States Patent and Trademark Office*